United States Patent
Hagersten et al.

(10) Patent No.: US 10,866,891 B2
(45) Date of Patent: Dec. 15, 2020

(54) SYSTEMS AND METHODS FOR EFFICIENT COMPRESSED CACHE LINE STORAGE AND HANDLING

(71) Applicant: Samsung Electronics Co., Ltd., Suwon-si (KR)

(72) Inventors: Erik Ernst Hagersten, Uppsala (SE); Andreas Karl Sembrant, Uppsala (SE); David Black-Schaffer, Uppsala (SE)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/195,942

(22) Filed: Nov. 20, 2018

(65) Prior Publication Data

US 2019/0155731 A1     May 23, 2019

Related U.S. Application Data

(60) Provisional application No. 62/588,717, filed on Nov. 20, 2017.

(51) Int. Cl.
*G06F 12/0806*     (2016.01)
*G06F 12/0895*     (2016.01)
(Continued)

(52) U.S. Cl.
CPC ...... *G06F 12/0806* (2013.01); *G06F 12/0811* (2013.01); *G06F 12/0864* (2013.01);
(Continued)

(58) Field of Classification Search
None
See application file for complete search history.

(56) References Cited

U.S. PATENT DOCUMENTS

| 9,407,286 B2 | 8/2016 | Kim et al. |
| 2006/0047916 A1 | 3/2006 | Ying et al. |
| (Continued) | | |

FOREIGN PATENT DOCUMENTS

| KR | 10-2014-0047916 A | 4/2014 |
| WO | WO-2017/077502 A1 | 5/2017 |

OTHER PUBLICATIONS

European Search Report for European Patent Application No. 18207155.5 dated Apr. 3, 2019.
(Continued)

*Primary Examiner* — Charles J Choi
(74) *Attorney, Agent, or Firm* — Harness, Dickey & Pierce, P.L.C.

(57) ABSTRACT

A multiprocessor system includes a plurality of nodes and at least one memory, wherein each node includes at least one processor, a first cache private to the node, a second cache at a higher level than the first cache, and a cache location buffer (CLB) private to the node, wherein, for at least one node of the plurality of nodes, at least one of the first cache and the second cache included in the at least one node includes at least one cache location that is capable of storing a compressed data unit of varying size, the CLB included in the at least one node is configured to store a plurality of CLB entries, each of the CLB entries including a plurality of location information values.

20 Claims, 10 Drawing Sheets

(51) Int. Cl.
   *G06F 12/0811*   (2016.01)
   *G06F 12/0864*   (2016.01)
   *G06F 12/02*   (2006.01)
(52) U.S. Cl.
   CPC ...... *G06F 12/0895* (2013.01); *G06F 12/0292* (2013.01); *G06F 2212/401* (2013.01); *G06F 2212/62* (2013.01)

(56) References Cited

U.S. PATENT DOCUMENTS

| | | | |
|---|---|---|---|
| 2011/0271055 | A1 | 11/2011 | O'Connor |
| 2013/0332652 | A1* | 12/2013 | Hayashi .............. G06F 12/0866 711/103 |
| 2015/0347297 | A1 | 12/2015 | Hagersten et al. |
| 2015/0372910 | A1* | 12/2015 | Janakiraman ....... H04L 45/7453 370/392 |
| 2016/0170878 | A1* | 6/2016 | Trika .................. G06F 12/0871 711/118 |
| 2017/0255561 | A1 | 9/2017 | Alameldeen et al. |

OTHER PUBLICATIONS

Notice of Allowance for corresponding Korean Patent Application No. 10-2018-0141960 dated Aug. 31, 2020.

* cited by examiner

SYSTEMS AND METHODS FOR EFFICIENT COMPRESSED CACHE LINE STORAGE AND HANDLING

CROSS-REFERENCE TO RELATED APPLICATION

This non-provisional application claims priority under 35 U.S.C. § 119 to U.S. Provisional Application No. 62/588,717, filed on Nov. 20, 2017, in the U.S. Patent and Trademark Office, the disclosure of which is incorporated herein in its entirety by reference.

BACKGROUND

1. Field

At least some example embodiments of the inventive concepts relate, generally, to methods and systems for accessing data in computer memory devices and, more particularly, to mechanisms and techniques for representing and handling compressed data.

2. Description of Related Art

Today's processors are often equipped with caches that can store copies of the data and instructions stored in some high-capacity memory. A popular example today of such high-capacity memory is dynamic random access memory (DRAM). Herein, the term "memory" will be used to collectively refer to all existing and future memory implementations. Cache memories, or "caches" for short, are typically built from much smaller and much faster memory than other memory implementations and can subsequently only hold copies of a fraction of the data stored in main memories or secondary storage devices at any given time. Today, caches are often implemented using SRAM and large caches can be implemented using DRAM. The caches described herein can be implemented using any existing and future memory technology.

Often, the memory system of a computer system includes a range of caches, with larger and slower caches (here referred to as higher-level caches) close to the main memory and smaller and faster caches (here referred to as lower-level caches) closer to the processor. This configuration is typically referred to as a cache hierarchy, memory hierarchy or memory system. Each level in the cache hierarchy is referred to as a cache level. FIG. 1 is a block diagram illustrating a portion of a computer system. In the example illustrated in FIG. 1, the computer system is a multi-processor system, where each CPU 101 is assigned its own first-level private cache 102 (L1 cache). More detailed examples of the CPU 101 and the L1 cache 102 are described below with reference to FIG. 2. A private cache is a cache where space for a data unit can only be in response to an activity of a CPU local to the cache (or a CPU in the same node as the cache, where the cache is private to that node). In this example, the second-level cache 103 is shared by all the CPUs 101 and may contain data and instructions that are accessed by all of the CPUs 101. Cache 103 is a global cache, since space for a data unit can be made in response to activities of any CPU 101. Furthermore, cache 103 is a shared cache, since each data unit can only exist in one shared copy (while each private cache can have its own replicated copy). Memory 105 also stores instructions and data that are accessed by all CPUs 101. The (main) memory 105 is typically accessed using a physical address, or PA for short, while the addresses generated by a CPU 101 are typically virtual addresses. Computer systems with several CPUs and several private caches, such as the system shown in FIG. 1, need efficient mechanisms for finding a requested data unit in one of the caches as well as for keeping the multiple copies of a datum stored in different nodes coherent.

Such computer systems will also typically include one or more secondary storage devices in addition to main memory and cache memory. These secondary storage devices can include one or more of hard drives, optical drives, flash drives or the like, which are collectively represented here by disk 104. The disk or secondary storage 104 may store several orders of magnitude more data than the memory 105, but is not directly accessible using a physical address. If a CPU 101 wants to access data stored on the disk 104, a virtual memory system (not shown in FIG. 1) moves a chunk of data, typically referred to as a page, from the disk 104 to the memory 105 and creates a translation from virtual addresses corresponding to that page to physical addresses. A special kind of translation cache (not shown in FIG. 1), typically called a "translation look-aside buffer" or TLB for short, caches the translation mappings from virtual pages to physical pages. The virtual memory system can be viewed as a caching system, which stores a portion of the data located in the disk 104 in the memory 105.

FIG. 2 is a block diagram for explaining an example cache hierarchy of a computer system. FIG. 2 shows a more detailed view of the cache organization from FIG. 1, where the CPU 204 is shown to contain several cache-like structures, such as the Instruction TLB (ITLB, 201) and Data TLB (DTLDB, 205), and a CPU core 202. The level 1 cache 102 is shown as including an instruction cache 200 and a data cache 206, interposed between the CPU 204 and the level 2 (and potentially higher level) caches 207. FIG. 2 also shows a high-capacity memory 208 connected to the cache hierarchy. Though, the computer system in FIG. 2 is illustrated as a uni-processor (i.e., one-processor) system, the computer system in FIG. 2 may be a portion of a multi-processor system.

When a CPU 101 requests data that is present in the cache, referred to as a cache hit, that request can be serviced much faster than an access to data that is not present in the cache, referred to as a cache miss. Typically, an application running on the CPU 101 that experiences fewer cache misses will execute more quickly and consume less energy than if the same application which suffers from more cache misses, assuming that the two versions of the application otherwise have similar properties. Therefore, considerable effort has been invested in techniques for avoiding cache misses, and also to design implementations that can make cache hits and cache misses efficient with respect to both their access latency and the energy that these memory transactions consume.

In order to understand how to develop solutions to this cache hit/miss problem, some understanding of cache organization and terminology will be useful. Typically, data are installed into caches in fixed chunks that are larger than the word size of a processor, known as cache lines. Common cache line sizes today are, for example, 32, 64 and 128 bytes, but as will be appreciated by those skilled in the art both larger and smaller cache line sizes exist for various cache implementations. The cache line size may also be variable for some cache implementations.

A common way to organize the data placement in memory 208 is in a manner that each data word is statically mapped to reside in one specific cache line. Each cache typically has an index function that identifies a portion of the cache where each cache line can reside, known as a set. The set may contain space to hold one or more cache lines at the same time. The number of cache lines which the set can hold is referred to as its associativity. Often, the associativity for all of the sets in a cache is the same. Such caches are often referred to as set-associative caches. The associativity may also vary between the sets. Each of the spaces in a set that can hold a cache line is referred to as a way.

In order to determine the identity of each cache line stored in each set, cache lines in a cache each have some identifier associated with them. One common example of such an identifier is an address tag. When looking for a specific cache line in a cache, its address may be used to determine the set of the cache where it may reside. The address tags of the cache lines of the corresponding set are compared to a tag portion of the address used to identify a cache line (see, e.g., TAG and ATAG depicted in FIG. 3 and described below) to determine if the desired cache line resides in the cache, and if so, in which way it resides, i.e., in which of the spaces in a set that can hold a cache line it resides. Typically, the size of such ADDR address tags is fairly large and can be in the range 30-40 bits, which is 6-10% the size of a typical cache line.

Often, each cache has built-in strategies to determine which cache line to keep in the set and which cache line to evict (also referred to as replace) to make space for a new cache line being brought into the set, referred to as its replacement policy. The replaced cache line is known as a victim or a replaced cache line. Popular replacement policies used in conjunction with cache memories include, but are not limited to, least-recently used (LRU), pseudo-LRU and random replacement policies.

Inclusive cache hierarchies require that a copy of a block of data (for example a cache line) present in one cache level, for example a block of data in the L1 cache, also exists in the higher cache levels (here, higher refers to cache levels with higher numbers than 1), for example in the L2 and L3 cache. Exclusive cache hierarchies only have one copy of the block of data (for example a cache line) existing in the entire cache hierarchy, while non-inclusive hierarchies can have a mixture of both strategies. In exclusive and non-inclusive cache hierarchies, it is common that a cache line is installed in the next higher cache level upon eviction from a given cache level.

With this background on caches and cache lines in mind, this discussion now proceeds to illustrate one conventional technique for identifying specific cache locations within a cache hierarchy like that shown in FIGS. 1 and 2. FIG. 3 is a block diagram for explaining a conventional implementation of a two-level cache hierarchy including a set-associative caches and a set-associative data translation look-aside buffer (TLB). FIG. 3 shows an example of the organization of a computer system node containing a CPU 301, a DTLB 303, an L1 CACHE 307 and an L2 CACHE 311. The CPU 301 generates a memory request containing a virtual address 302 (VADDR), which is used to perform an associative lookup in the DTLB 303. The virtual address 302 is in this example divided into three parts: P_OFFSET (page offset, for example consisting of the low-level bits), TAG and INDEX. The INDEX portion of the virtual address 302 is used to identify the set within the DTLB 303 where the address translation may be stored.

The illustrated DTLB 303 used in this example has a two-way associative organization, showing two entries of the identified set. Each entry consists of an address tag (ATAG) 304, and physical page frame (PPF) 305. The TAG portion of the virtual address 302 is compared with the ATAGs 304 of each entry of the identified set. The logic 318 determines if there is match for any of the entries, and, if so, controls the MUX 306 to select the corresponding PPF 305. A physical address PADDR 316 is composed by concatenating the PPF 305 selected by MUX 306 with the P_OFFSET portion of the virtual address 302. Alternatively, if neither of the entries of the identified set match the TAG portion of the virtual address 302, then a TLB fill operation is performed and the needed translation entry is brought into the DTLB 303.

The PADDR 316 is used to perform a lookup in the L1 CACHE 307. More specifically, an INDEX portion of the PADDR 316 is used to identify the set where the cache line containing the requested data may be stored. (It should be noted that this L1 INDEX may contain different bits than the DTLB INDEX). The depicted L1 CACHE 307 has a 2-way associative organization with two entries in the identified set. Each entry consists of an address tag (ATAG) 308, and data 309 of the corresponding cache line. A TAG portion of the PADDR 316 is compared with the ATAGs of each entry of the identified set. The logic 319 determines if there is match for any of the entries, and controls the MUX 310 to select the corresponding data. If neither of the entries matches (depicted by L1 MISS 317) a lookup in the L2 CACHE 311 is needed. While the division of PADDR 316 into INDEX and TAG portions for the L2 CACHE lookup may differ from the division done for the L1 CACHE lookup, the remaining steps for the L2 CACHE lookup are typically similar to those performed for the lookup in the L1 CACHE. If a miss in the L2 CACHE is determined, new lookups in higher-level caches or accesses to memory may be needed. It can be noted that if the INDEX portion of PADDR 316 used by the L1 cache is entirely composed by P_OFFSET bits, the access to the L1 cache 307 can be started before the PPF information coming from the MUX 306 is available. This is often referred to as a virtually indexed, physically tagged cache (VIPT).

It would be appreciated by someone skilled in the art that several "nodes", each with a memory hierarchy similar to the one depicted in FIG. 3, can be connected together to form a coherent multiprocessor system. Another example of a multiprocessor is shown in FIG. 1, where each CPU has its own private L1 cache. This further complicates the task of locating where a requested data resides since it is no longer sufficient to always search for the data in the next higher cache level. Mechanisms for searching caches of the other nodes as well as for keeping the multiple copies of a datum stored in different nodes coherent are needed.

As further background information, FIG. 4 is a block diagram illustrating an example implementation of a tag-less cache. Such caches rely on location information (LI), which is sometimes referred to as cache line pointers CP, corresponding to a requested cache line of a matching cache table entry (CTE) (sometimes referred to as a region location) to indicate in which cache, as well as in which location within that cache, the requested cache line resides. This will cause computer systems to perform a direct cache lookup at the appropriate cache. The example implementation of the tag-less cache illustrated in FIG. 4 includes a two-level cache hierarchy and a two-level cache location buffer (CLB) hierarchy, where the first level is virtually accessed and the second level is physically accessed For example, in the system (which may be a node in a multiprocessor system) shown in FIG. 4, the location information can distinguish between L1 CACHE and L2 CACHE. It may also be able to distinguish between other caches present in the rest of the multiprocessor system, not shown in this FIG. FIG. 4 shows a tag-less node, that may be connected to other nodes in a multiprocessor system, with a two-level cache hierarchy of set-associative caches and a CPU (which may contain one or many traditional caches, here depicted L0), where CPU 401 generates addresses (ADDR) 402. FIG. 4 also shows a two-level CLB hierarchy of set-associative CLBs, where first-level CLB CLB1 410 and second-level CLB CLB2 420 are indexed with ADDR. As used in the present disclosure, the term "CLB1" may refer to a first-level CLB and the term "CLB2" may refer to a second-level CLB. Each entry in CLB1 410 includes at least an address tag (AT) 411 and a cache location table (CLT) 412. It may store additional information, such as region information (RI) 413. The CLT 412 stores location information (LI) for the cache lines of a corresponding region (also referred to as a micropage). FIG. 4 shows four LI per region as an example. Empirical studies by the inventors shown that 8 to 16 LI per region (i.e., 8 to 16 data units (cache lines) per region) to be cost-effective and efficient. The location information encodes the location where the corresponding cache line can be found within a multiprocessor system. The location information may, for example, contain the identity of a cache where the data unit can be found. The location information may also contain a location within that cache where the data unit can be found. Alternatively, the location information may contain the identity of a node where the data unit can found or contain some symbol that provides information about its location, for example the symbol "MEM" indicates that the data unit can be found in memory. In at least some cases, the symbol "don't know" may indicate that the location of the corresponding data unit is not recorded in the CLT corresponding to the region.

MUX 416 selects the CLT with an AT 411 matching a TAG portion of the ADDR 402 and a MUX 415 selects the LI 414 corresponding to the requested cache line based on the L-OFFSET portion of ADDR 402. If the cache identity stored in the selected LI corresponds to the L2 cache 440, an address 417 for accessing the requested data unit in L2 CACHE 440 is formed using an INDEX portion of the address 402 and a portion of the location information 414. In the example of a set-associative L2 CACHE 440, that portion contains information corresponding to the associative way where the requested data unit is stored. If the cache identity stored in the selected LI corresponds to the L1 cache 430, an address 418 for accessing the requested data unit in L1 CACHE 430 is formed in a similar way.

For a cache hierarchy consisting of set-associative cache with the same associativity, the number of bits in each LI is dependent on the number of ways and number of caches of the cache hierarchy covered by the CLB. One LI value can be reserved for an invalid pattern ("MEM"). In this implementation, the number of LI bit(s) is equal to the log base 2 of the number of way(s) plus the number of cache levels covered by the CLB plus one (i.e., (log 2(way)+log 2(levels)+1)). If the number of ways of the different cache levels varies, or if caches other than set-associative caches are used, those skilled in the art will appreciate that other LI representations are possible. Typically, the size of LI is much smaller than the size of a typical address tag. A 3-level cache hierarchy with 16-way associative caches at each level can be encoded using 5 LI bits.

In the example illustrated in FIG. 4, each entry in the L1 cache 430 and L2 cache 440 to have a backwards pointer (BP), 432 and 442 respectively, associated with its cache line. (DATA), 431 and 441 respectively. In this example, the BP pointers point to their respective associated CTE in CLB2 420. Each CTE in CLB2 420 contains an address tag (AT) 421, a CLT 422 and a CLB1 Pointer (CIP) 423. If the CLB2 entry has a corresponding CLT residing the CLB1 410, its CIP will point to that entry. In that case CLB1 410 will contain the up-to-date information for this region. In that case, the CLE in CLB1 is said to be the active CLB entry, while the CLB entry for the region in CLB2 420 contains a passive entry. CLB2 420 may be required to contain a passive entry for a region if CLB1 410 contains an active entry for the region.

In one embodiment, when no matching CTE can be found in CLB1 410, a corresponding CTE is looked for in CLB2 420 and copied to CLB1, while an old entry in CLB1 copied to CLB2 420, this is referred to as spill and fill or simply spill/fill (SPILL and FILL in FIG. 4). A spill is also for example performed when a traditional inclusive cache evicts a data unit to the next level to make space for a new data unit, which may be brought in (fill) from the next cache level. A similar spill/fill activity will be performed between the different CLB levels, where CLB entries are moved between the CLB levels, since the CLB levels forms an inclusive hierarchy. A directory DIR may be at the root of the CLB hierarchy and spill/fill with the highest level CLBs.

It is possible to initiate access to the requested data unit in parallel with the spill/fill activity.

The contents of the CLBs of a multi-level CLB implementation may be kept consistent with the locations of the data units of the multi-level cache system they manage. A data unit that is moved in the cache hierarchy, including but not limited to movements caused by requests for the data unit from the CPU, evictions of the data unit, prefetching activities and coherence activities, cause an update to its corresponding location information in one or many of the CLBs. For example, in FIG. 4, evicting a data unit 441 from cache 440 can involve the steps of following its associated BP 442 pointer to find its corresponding CTE (which in this example is in the CLB2 420) and updating its corresponding location information to point to the data unit's new location (e.g., storing the MEM symbol). And, if the CIP pointer of the corresponding CLB2's CLE is valid, following the CIP to find its corresponding CTE in the CLB1 410 and updating its location information associated with the cache line. In one embodiment, the entry in the CLB2 is not updated if there is a valid CIP pointer. For example, CLTs may be updates such that \ only active CLTs are updated.

As will be appreciated from the foregoing, using the above-referenced tag-less cache systems, i.e., cache systems where the data unit stored in a cache does not have an address tag associated with it, will result in a number of different types of transactions which will occur when various cache lines located in different storage devices are requested by a CPU 401. The node depicted in FIG. 4 may be a subsystem (or node) of a larger multiprocessor system comprised from several such cache nodes. Keeping the data of the caches in the many nodes coherent requires a cache coherence protocol, for example implementing either snooping or directory-based coherence. The coherence protocol will send coherence requests to the depicted node in FIG. 4 (EXTERNAL REQUESTS). These requests will typically first turn to CLB2 420, which may determine that this cache system does not have the requested cache line (CLB2 miss or a CLB2 hit to an entry with an inactive CIP and the location information of the requested cache line holding the value memory pattern). If so, no further action is needed with respect to the data caches L1 and L2 (known as coherence filtering), but the corresponding LI in the active CLT may nevertheless need to be updated to track a new location associated with the data unit. Otherwise, the CLB2 lookup may provide the requested location information (CLB2 hit and the location information of the requested cache line holding storing the location of the cache line), or it may determine that CLB1 410 stores the associated location information (CLB2 hit and a valid CIP). In the latter case, a lookup in CLB1 410 is needed to determine either the location of the requested cache line or that the cache line does not reside in this cache sub-system. (The corresponding location information in CLB1 contains a memory pattern). Depending on the nature of the coherence request, for example an invalidation request, a read request, or an exclusive read request, the coherence protocol will perform some operations on the requested data unit and possibly change its state. The corresponding LI in the active CLT may also need to be updated to track a new location associated with the data unit Even though the node shown in FIG. 4 consists of two cache levels, someone skilled in the art would understand that nodes can be assembled using other number of levels and may contain more than one CPU. Furthermore, the number of cache levels and the number of CLB levels in a node do not need to be identical.

FIG. 5 is a block diagram illustrating a portion of a computer system including two CPUs connected to a two-level cache hierarchy and a two-level cache location buffer (CLB) hierarchy. For example, the computer system in FIG. 5 includes two CPU nodes (580 and 590), each within their own one-level cache hierarchy with one CLB (CLB1A 503 and CLB1B 513) and a private cache L1 CACHE (504 and 514). The system also contains a global shared L2 CACHE 523 (sometimes referred to as a last-level cache LLC), which is shared between the two CPUs 501, 511.

A lookup in a CLB1 (513 or 503) selects a single LI based on an address generated by their respective CPUs (501, 511), for example using techniques similar to CLB1 410. As indicated by the three arrows initiated by the two shown CLT entries in CLB1A 503 and CLB1B 513, the selected LI may identify the location to be either in the corresponding L1 cache (504 and 514 respectively), in the L2 cache 523 or in the other node (showed by 570 and 571 respectively). In this example, CLB1A 503 identified its accessed data to be 505 in the shared L2 cache 523, while CLB1A 503 identified its accessed data to be 505 in its L1 514 (show by the solid arrows).

FIG. 6 is a block diagram illustrating a portion of a computer system including a tag-less cache hierarchy with a single monolithic last level cache. Turning to FIG. 6, FIG. 6 shows a generalized depiction of a tag-less multiprocessor memory system. This example consists of N nodes, ranging from Node-1 601 to Node-N 699. Each node has X levels of CLBs and Y levels of private caches, i.e., caches private to the node. The nodes are connected together with each other through a network on chip (NoC) 650 circuit. NoC 650 also connects the nodes to the directory (DIR) 660, the global last level cache (LLC) 670 and memory 680. DIR 660 is organized similarly to CLBs and has entries that consist of at least an address tag (AT) 661 and a cache location table (CLT) 662. An entry may also contain additional information, such as region information (RI) 663, which is described in more detail below. The highest level CLBs in the nodes (CLB-X 630, 693) spill/fill to/from DIR. DIR also plays a central role in the coherence protocol that keep the contents of the caches and the CLBs coherent and consistent.

The CLBs and DIR can be viewed to form one inclusive "cache hierarchy", caching metadata with information about the content of the data cache hierarchy. The data hierarchy, containing L-1s through L-Ys and the LLC can be viewed as a separate cache hierarchy with no inclusion properties imposed upon it. It may for example by non-inclusive, inclusive or exclusive.

In the example shown in FIG. 6, each node has one CPU (CPU-1 600, CPU-2 696), possibly containing zero, one or many traditional tag-based caches, depicted L0-D and L0-1. Memory requests that cannot be satisfied by any of the traditional L0 caches will generate a lookup in the node's CLB-1 (e.g. 610) in search for a corresponding CLB entry CLT, possibly using a scheme similar to CLB-1 410 in FIG. 4. If a corresponding entry is found in CLB-1, the location information (LI) corresponding to the requested data unit can be located in its CLT field (612). The LI identifies a location where the requested data unit can be found. LI residing in the CLB 610 in Node-1 601 may identify either one of the node's own caches (L-1 620 through L-Y 640), the LLC (670), the memory 680, or any of the other nodes (Node-2 690 through Node-N 699) as a location for the data unit it is tracking. The LI cache 620 may also identify the data unit's location within an identified cache. The LI cache 620 may also indicate if a data unit resides in any of the traditional caches L0-D or L0-I of a CPU 600 connected to the node.

If a cache location (or memory) is identified as a location where the data can be found, the request can be satisfied by reading that cache directly without consulting a directory (DIR) 660. If a node is identified as the location where the requested data can be found, a request is sent to the CLB-X of that node and the request satisfied similarly to the EXTERNAL REQUESTS discussed for FIG. 4. Still, the directory does not need to be consulted in order to find the data. This is different from most traditional directory-based coherence schemes, where the directory is consulted and updated for accesses that go outside of a node.

Even though FIG. 6 shows one CPU in each node, someone skilled in the art would realize that a node may contain any number (including zero) of CPUs, GPUs, accelerators or other devices that may access memory, such as I/O devices. Furthermore, the configuration and size of CLBs and caches may differ widely between the nodes.

There may be a strict hierarchical search level-by-level in the inclusive CLB/DIR hierarchy. If the location information is not found at a level CLB-i, a lookup is performed at the next level CLB-(i+1). If the location information cannot be found in the node's highest level (CLB-X), a lookup is performed in DIR. If location information is found at a CLB level or in DIR, a read request can be sent to the data location identified by its corresponding location information at that level and a new CLE entry corresponding to the requested region is created in CLB-1. The CLB/DIR hierarchy is inclusive. This implies that if there is an CLB entry available at level CLB-L, there has to be an entry installed at level CLB-(L+1). The CLB entry closest to the CPU is active. There may be inclusion enforced between cache level K (as well as lower cache, i.e., higher up in FIG. 6) and a certain CLB level C (as well as all higher CLB levels, i.e., further down in FIG. 6. As an example, in order for data to be available in any of the caches L-1 620 through L-Y 640, there has to be a corresponding entry in CLB-X 630. If that entry in CLB-X 630 is evicted, all data of the corresponding region should be evicted from caches L-1 620 through L-Y 640. This is referred to as forced eviction. Furthermore, all CLB entries of the same node down to CLB-1 610 also need to be evicted.

It should be noted that there is no inclusion requirement between the cache levels within a node (e.g., caches L-1 620 through L-Y 640) or between LLC 670 and cache in a node (e.g., caches L-1 620 through L-Y 640). For example, valid data corresponding to a specific address may exist in the L1 cache 620, but not in neither cache L-Y 640 nor in the LLC cache 670. This opens up for cache bypass optimizations, where for example streaming data only need to be installed in L1 cache 620 (actually, only in L0 if it exists) and at no other levels. However, the corresponding CLB entries (which typically is 50 times smaller its corresponding data region) need to be installed at all levels.

The directory (DIR) 660 contains CLB-like information: address tag (AT) 661, Cache Location Table (CLT) and Region Information (RI). While these fields have the same name as the fields of CLBs (e.g., CLB-X 630), the contents of these fields may differ from the corresponding CLB fields. The RI field 663 of DIR 660 may contain N so-called presence bits (PB), indicating which nodes are tracking the region, where N corresponds to the number of nodes in the system. If bit K in the PB is set it implies that there is a corresponding entry in CLB-X of node K. This further implies that there may be cached data in any of the cache levels L1 through L-Y of node K and also that there may be a corresponding entry in CLB-1 in node K, which would enable the CPU in node K to access any cache line of the corresponding region. While the description refers to an N-bit implementation of the PB information, someone skilled in the art would realize that many scalable techniques used for directory implementation, including but not limited to coarse-grained, limited pointers and linked lists, can be used to implement a similar functionality.

The PB bits can be used to classify regions. A region is classified as a private region (PR) if exactly one of the PB bits of the corresponding entry in the directory 660 is set. Empirical studies show that about 80% on average of all accessed regions are PR regions across a wide selection of studied benchmarks. The region classification PR implies that data of the region may exist only in the one node with its corresponding PB bit set and also guarantees that no other node can access data from the region at this point in time. A node 601 with its PB bit being the only set bit in DIR may be notified that the corresponding region is a private region (PR) and may record the regions classification in its corresponding region information (RI) in its CLB (e.g. in CLB-1 610 through CLB-X 630). PR regions may be accessed efficiently in many respects. For example, no global coherence is needed for the node to gain write permission for a data unit present in the node for which the node currently only has read permission (to upgrade the data unit from state S to state E), since only one node may have caches copies of its data and no other node can access any of the data units of the region. Also movements of data units of a PR region may be implemented efficiently, since data can be moved up and down the entire cache hierarchy (e.g., performing an eviction from L-X to LLC or moving data from LLC to L-1) without the need to inform any structures outside the node. The movement also needs to be recorded in a CLB local to the node (610 through 630). This implies that the CLT information of a PR region stored in the CLBs of the node (610 through 630) may differ (e.g., be more up-to-date) than the CLT information of the region stored in DIR 660.

When a second node (e.g., 690) accesses a PR region (empirical studies show that this is a relatively rare event), it will miss in all its CLBs 691 through 693 and will send a request to DIR 660 to get the appropriate location information LI needed to access the data and also to allow for creations of its own CLB entries in CLB 691 through 693. Since this request is for a PR region, DIR 660 may not have up-to-date information, it needs to get up-to-date location information from node 601 and make sure that CLBs of node 601 no longer marks the region as PR, update its own CLT information for the region, set the PB bit corresponding to Node-2 690 and send appropriate CLB information for the region to node 690. Node-2 690 can now create its own local CLB entries associated with the region. Node 601 may have to complete all its ongoing direct-to-data memory requests for the region before sending up-to-date location information to DIR 660.

If yet another node (e.g., Node-N 699) accesses the region, it will also miss in all its CLBs and will also send a request to DIR 660, which now has up-to-date information about the region and can reply with the appropriate information to Node-N 699 and also will set the PB bit of the region for the requesting node (i.e., node 699)

Regions with more than one PB bit set are classified as shared regions (SR). This implies that more than one node have CLBs tracking the location information for this region. It also implies that the nodes with corresponding PB bits set may store data units of the region in any of their caches (e.g., 620 through 640). A request from a CPU (e.g., 610) to access a data unit, which cannot be satisfied locally within the node (e.g., by caches L-1 620 through L-Y 640), may need to initiate a global coherence transaction if the region is classified as SR.

A global coherent read transaction to an SR or PR region (a read which cannot be satisfied from a local cache (e.g., caches L-1 620 through L-Y 640)) may utilize the location information retrieved from its local CLBs (e.g., CLB-1 610 through CLB-X 630) to access the data directly without involving the DIR 660 or communicating with any nodes other than the node that may be identified by the location information. This is referred to herein as a direct-to-master access. Empirical studies show that 75% of all global coherent transactions to SR regions are direct-to-master read transaction accesses. So, if 20% of the global transactions initiated by CPUs are to SR pages and 75% of those do not need to access DIR, then 95% of the global coherence transactions do not need to access DIR when using at least some of the above-referenced cache structures and techniques, whereas all global coherent transactions need to access DIR for traditional directory-based protocols.

Since SR regions have several nodes tracking the location of its data units, their data unit movements need to be reflected in all nodes tracking the region (i.e., those nodes having an active CLB entry for the region) and the location information of the moved data units is updated in those nodes. The location information of CLBs of different nodes tracking the data unit should be updated in a coherent manner such that the CLBs agree about where the data resides (referred to as its the master location). It may also be highly likely or, alternatively, guaranteed that a data unit location accessed based on location information retrieved from a CLB contains the correct data (referred to as determinism).

One common reason for such data unit movements is global coherent write requests, i.e., a requesting node that currently does not have write permission to a data unit requests write permission through a global coherent request, for example an invalidation request or an exclusive read request. After the request has completed, the data unit will only reside in the requesting node.

Global coherent write requests may be sent by a requesting node (e.g., 601) to the directory 660, which locates the corresponding directory entry, retrieves the corresponding PB bits for the region and forwards a request to all nodes (except the requesting node) which have a corresponding PB bit set, which nodes are referred to as the slave nodes (for example nodes 690 and 699). The slave nodes send ACK messages when they have made sure that any future requests for the data unit originating in the slave node will be directed to the requesting node. This can for example be achieved by changing their location information for the data unit in their CLBs to point to the requesting node (601), which will become the new master node. The ACK messages can either be sent to the DIR 660, which aggregates them and sends an ACK to the requesting node once all ACKs have been received, or sent directly to the requesting node 601. Once the requesting node knows that all ACKs have been received, it has acquired exclusive write permission for the cache line and completes the request. A completion message may be sent to the DIR 660 upon the completion of the request.

Another common reason for data movement is evictions (also called replacements). Evictions local to a node, for example eviction from L-1 620 to L-Y 640 are handled locally, tracked by its local CLB entries and are not visible outside the node. However, a global eviction of a master data unit, for example from location 641 in L-Y 640 to a new location 671 in LLC 670 must be reflected by all nodes tracking the region (i.e., all nodes with CLB entries for the region). Global eviction may be implemented by first copying the value of the data unit stored in its old location (641) to the new location (671), while keeping the data stored in the old location (641) valid. Then, a global coherent eviction request, with information about the new location (671), is sent from the requesting node (e.g., 601) to DIR (660), which forwards a request to the slave nodes (e.g., 690 and 699). Once the slave nodes have updated their corresponding location information to the new location (671) they send an ACK message. Once the requesting node knows that all ACKs have been sent, it has acquired eviction permission for the data unit and can reclaim the old location and the request is completed. A completion message may be sent to DIR 660 upon the completion of the request.

A slave node may not send ACK messages until some its outstanding requests (for example all direct-to-master requests) for the requested cache line have been completed.

The directory 660 may implement a blocking mechanism that ensures that there can be at most one outstanding global request of certain types for each data unit. Examples of such request types could be global coherent write requests and global coherent eviction requests. The blocking for a cache line ends after the request has been completed, or as otherwise specified by the coherence protocol. The blocking mechanism can be exact, for example implemented by one lock per data unit in the directory, or could be an over-approximation, where addresses hash to a limited pool of locks and that the blocking of a data unit will block accesses for all other data units hashing to the same lock.

The blocking may be done with a region granularity, instead of a data unit granularity, and some of the CLB/directory spill/fill requests also need to block until their updates have been completed. This guarantees that no global coherent write requests are in progress while the nodes and directory spill/fill CLB information.

Another useful region classification is a region with no PB bits associated with the region being set in DIR 660. This implies that the regions data units cannot be present in any of the node's caches L-1 though L-Y and that none of the nodes currently can access its data units. This is referred to as an untracked region (UR). Data of UR regions may still be cached in the LLC. Data units of UR regions can be evicted from LLC 670 without any global coherence requests. A region with no corresponding entry in DIR 660 is classified as a memory region (MR). Data units of MR regions cannot be cached in neither the nodes nor in the LLC. Replacing a CLT entry from DIR 660 implies that all data unites of that region should be forcefully evicted from the LLC.

The cache system of FIG. 6 may be a tag-less cache system, i.e., a cache system where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 6 (LO-I and LO-D), may still have address tags associated with their cache data units though.

FIG. 7 is a block diagram illustrating a generalized tag-less cache hierarchy with many slices of last level cache FIG. 7 differs from FIG. 6 in that the LLC has been cut up into LLC slices (LLC-1 771, LLC-2 772 and LLC-N 779) and placed on the other side of the network on chip (NoC) 750 close to the nodes. Each of the slices is configured with a replacement counter (RC) 775, 776 and 777 respectively. These counters count the number of cache replacements in each LLC slice. It should be noted that the example illustrated in FIG. 7 places the LLC slices outside of each node (represented by the dashed boxes). Even though each LLC slice (e.g., 771) is adjacent to each node and can be accessed with a very short latency from the node's CPU (710), they can still be regarded as a piece of the large global LLC. Evicting a region entry from a CLB-X (e.g., 730) does not necessarily require the corresponding region data residing in the LLC slice close to the node (e.g., 771) to be forcefully evicted. Further, a node (e.g., 701) may store location information in its CLB (e.g., 710) pointing straight to a location in a remote LLC slice adjacent to a remote node (e.g., a location in 772) and may access that data without the need for indirections through neither DIR 760 nor any of the CLBs of that node (790).

There exist LLC implementations today that are reminiscent of FIG. 7 (only in the sense that the LLC is physically divided into banks that are physically placed close to the nodes and not with respect to other elements of FIG. 7). However, solutions today (for example server chips from Intel) place data units in LLC banks according to their address, which results in that 25% of the accesses hitting in an LLC bank will hit in the bank close to the node, assuming four nodes. The cache access technique described according to at least some of the examples discussed above, e.g., based on location information pointers, allows full flexibility for placement of the data units and does not depend on the address of a data unit, which potentially could increase the local portion of the LLC hits. One option would be to replicate all the shared data in all the LLC slices where it is accessed. However, replicating all shared data in all LLC slices will consume LLC capacity. As stated before, 20% of regions are typically shared. Assuming that all shared regions will need to be replicated in all nodes, a four-node system would use up 80% of its LLC capacity storing replicated LLC data. This may be sub-optimal, prompting for the need for smarter LLC allocation/replication decisions.

When a data unit is first allocated to an LLC slice, it may appear beneficial to always put it in the LLC slice adjacent to the CPU accessing it. However, since the threads running in the different CPUs may have different LLC capacity requirements, it may sometimes be beneficial to place the data unit in a remote LLC slice and thus "steal" some of its local LLC capacity. In at least one example, the allocation decision is made based on LLC slice cache pressure. Each LLC slice has a replacement counter (RC 775, 776, 777) registering the number of replacements taking place in the slice. In at least one example, these counters are monitored periodically to determine the cache pressure for each LLC slice, where a higher count indicates a higher pressure. When allocating an LLC space for a data unit, space is always allocated in the local LLC slice if its cache pressure is the lowest. If not, a configurable fraction of its allocations will be made to the remote LLC slice that currently has the lowest pressure, while the remaining allocations are made in the local LLC slice. In at least one example, allocation of space in remote LLC slices will only occur under certain circumstances, e.g., if the cache pressure of the local LLC slice is above a certain threshold.

In a traditional cache topology, where a single last-level cache is shared by several nodes, such as L2 103 in FIG. 1 or LLC 670 of FIG. 6, there is typically at most one copy of each data unit residing in the LLC (referred to as a shared cache) while caches that are private to a node (also referred to as a private cache), such as the L1 caches 102 of FIG. 1, may each store replicated copies of the same data unit. The LLC slices of FIG. 7 have the option of either storing a single copy of a data unit in one of the LLC slices and have all nodes access using identical location information, or storing several so-called replicated copies of a data unit in several LLC slices.

For example a data unit 774 may be the only LLC copy for a data unit and both CLT 712 in CLB-1 710 and a CLT in CLB-1 791 have their associated location information pointing to location 774. This is referred to herein as shared LLC data. After a decision has been made to replicate the data, a copy of the data can be put in location 773 and the associated location information in CLT 712 changed to point to location 773. The data unit stored in 773 is referred to as a local LLC data unit. The local data stored in location 773 can only be accessed indirectly through a lookup in a CLB local to Node 1 701, while the global data stored in location 774 can still be accessed directly by, for example Node N 799, by using location information pointing to location 774.

In at least one example, the cache system of FIG. 7 is a tag-less cache system, i.e., a cache system where a data unit stored in a cache (for example the caches L-1 through L-Y of the nodes and the LLC) not have an address tag associated with it. Instead, a location information with an address tag associated with it will identify the location where the data unit is stored. The traditional caches included in FIG. 7 (LO-1 and LO-D), may still have address tags associated with their cache data units though.

To summarize the discussion associated with FIG. 3-7, it will be appreciated by those skilled in the art that contemporary implementations of a cache hierarchy may require many associative lookups to be performed in TLBs as well as at different cache levels before the location of a requested cache line can be determined. Furthermore, each translation entry and cached cache line needs to be accompanied by an address tag and a plurality of these tags need to be compared with a portion of an address at each of these levels. Overall, this implementation comes at an enormous cost in terms of the dynamic energy used for each associative lookup. It also requires substantial overhead in static energy and memory capacity to store the extra tag information that is needed to perform the comparisons. Furthermore, it also requires substantial overhead in static energy and memory capacity to store the data of every cache line in the cache hierarchy.

Accordingly, it would be desirable to provide systems and methods that avoid both the afore-described problems and drawbacks associated with cache lookups for data and at the same time remove some of the capacity, static power cost associated with cache line storage by supporting efficient representation and handling of compressed data in the cache hierarchy.

SUMMARY

According to at least one example embodiment of the inventive concepts, data units are stored in private caches in nodes of a multiprocessor system, each node containing at least one processor (CPU), at least one cache private to the node and at least one cache location buffer (CLB) private to the node. In each CLB location information values are stored, each location information value indicating a location associated with a respective data unit, wherein each location information value stored in a given CLB indicates the location to be either a location within the private cache disposed in the same node as the given CLB, to be a location in one of the other nodes, or to be a location in a main memory. Compressing cache lines is a way to make more efficient use of the cache capacity. The CLB location information can be extended with the ability to also identify the location of uncompressed as well as compressed cache lines while adding only a logarithmic cost (e.g., adding two bits to each location information) compared with a traditional linear cost (adding four times more address tags). The CLB location information can mark cache lines containing "0" with a special ZERO symbol and thus avoid allocation of cache lines containing "0" in the cache hierarchy, avoiding movements of such cache lines and avoiding repeatedly copying the value "0" to newly allocated regions of memory.

According to at least one example embodiments of the inventive concepts, a multiprocessor system includes a plurality of nodes and at least one memory, wherein each node includes at least one processor, a first cache private to the node, a second cache at a higher level than the first cache, and a cache location buffer (CLB) private to the node, wherein, for at least one node of the plurality of nodes, at least one of the first cache and the second cache included in the at least one node includes at least one cache location that is capable of storing a compressed data unit of varying size, the CLB included in the at least one node is configured to store a plurality of CLB entries, each of the CLB entries including a plurality of location information values, each location information value pointing to a beginning of a location associated with a respective data unit, each location information value stored in the CLB included in the at least one node indicates the location to which the location information value points to be, a location within the first cache included in the at least one node, a location within the second cache included in the at least one node, or a location in the at least one memory, and at least one of the plurality of location information values is capable of identifying locations corresponding to the respective data unit, with a finer granularity than the size of an uncompressed data unit.

According to at least one example embodiment of the inventive concepts, a data management method includes storing data units in private caches in a plurality of nodes of a multiprocessor system, wherein each node includes at least one processor, at least one cache private to the node and at least one cache location buffer (CLB) private to the node; and for at least one node from among the nodes of the multiprocessor system, storing, in the at least one CLB included in the at least one node, a plurality of location information values, each location information value indicating a location associated with a respective data unit, wherein each location information value stored in the at least one CLB indicates the location associated with the respective data unit to be, a location within the at least one private cache included in the at least one node, a location in one of the plurality of nodes other than the at least one node, or a location in a main memory, and encoding at least one location information value from among the plurality of location information values with a symbol which indicates that a data unit stores a first value.

According to at least one example embodiment of the inventive concepts, a non-transitory, computer-readable storage medium comprising computer-executable instructions that, when executed by a computer, cause the computer to perform operations including storing data units in private caches included in a plurality of nodes of a multiprocessor system, in global caches and a memory, wherein each node includes at least one processor and at least one cache private to the node, the plurality of nodes being connected via a network; and for at least one node from among the plurality of nodes, storing a plurality of location information values in a cache location buffer private to the at least one node; and encoding at least one location information value from among the plurality of location information values with a symbol which indicates a data unit stores a first value.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
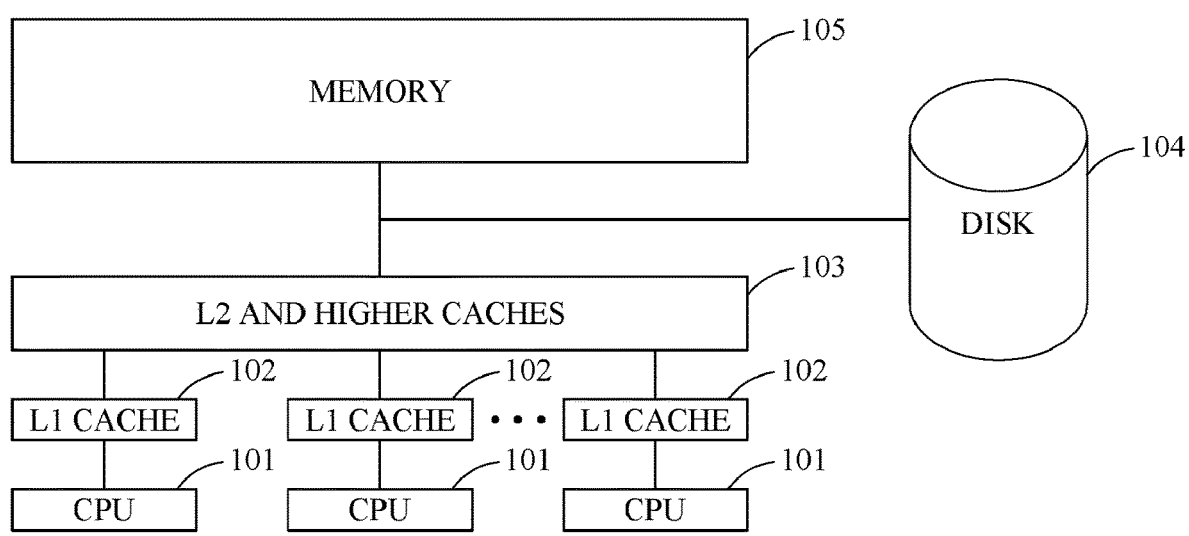
FIG. 1 is a block diagram illustrating a portion of a computer system.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

In the following description details including functional blocks and an example cache location table CLB for implementing an efficient alternative to traditional cache tagging schemes according to at least some example embodiments of the inventive concepts are provided. In addition, while the CLB schemes according to at least some example embodiments of the inventive concepts are described with reference to specific caches and computer architectures, those skilled in the art will recognize that one or more example embodiments of the inventive concepts are applicable to a wide range of memory and system architectures. In some instances, for the purpose of simplicity, well-known circuits and structures are not described in detail.

According to at least some example embodiments of the inventive concepts, instead of discarding useful location information, which is known every time a cache line is moved between the levels in the hierarchy and between the nodes, the location information is stored (e.g., updated) in the cache handling scheme (CHS) and utilized for later cache access. In the present disclosure, the term "location information" is synonymous with, and may also be referred to on occasion, as "LI" or "location information LI." Further, a value of particular location information may be referred to as a "location information value." The CLB is organized in an associative way. Accordingly, each CLB entry includes an address tag field and a plurality of LIs associated with the address tag field, although other techniques for storing the location information are possible according to at least some example embodiments of the inventive concepts. Subsequently, the information stored in the CLB can be used to quickly access the location of the requested data without the need for additional associative lookups. More precisely, the CLB provides location information LI from which the right cache identity, as well as the right location within the cache, can be determined without the need to access any address tags of the cache. LI may also identify a remote node as the location for the associated data. Thus, using techniques in accordance with at least some example embodiments of the inventive concepts, requested data can be found more quickly in the cache hierarchy, and in a manner which consumes less energy. The techniques described also enable more flexible and less hierarchical cache topologies to be efficiently implemented.

Figure 2:
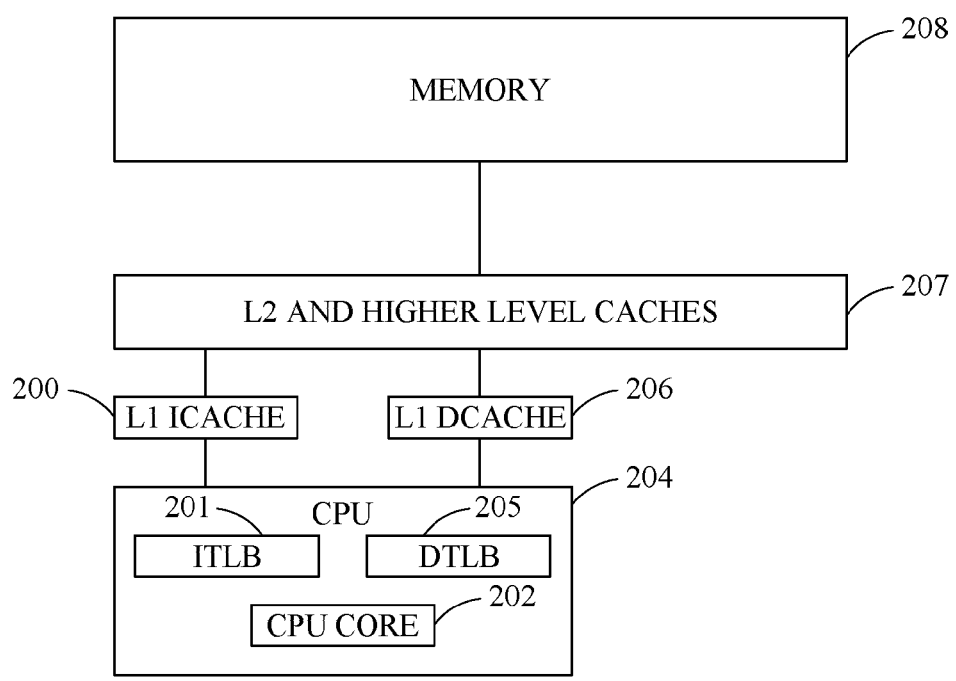
FIG. 2 is a block diagram for explaining an example cache hierarchy of a computer system.
Figure 3:
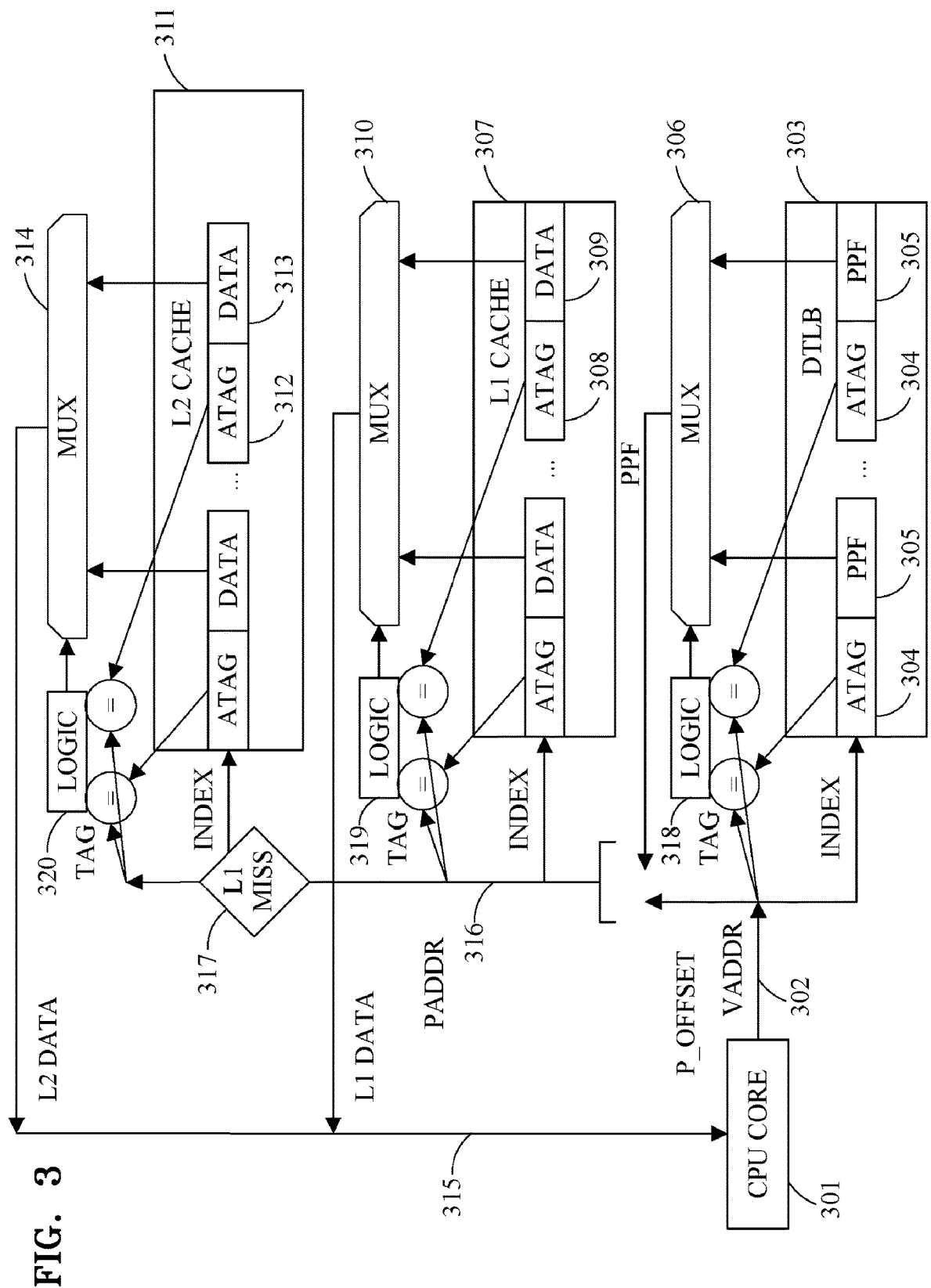
FIG. 3 is a block diagram for explaining a conventional implementation of a two-level cache hierarchy including a set-associative caches and a set-associative data translation look-aside buffer (TLB)
Figure 4:
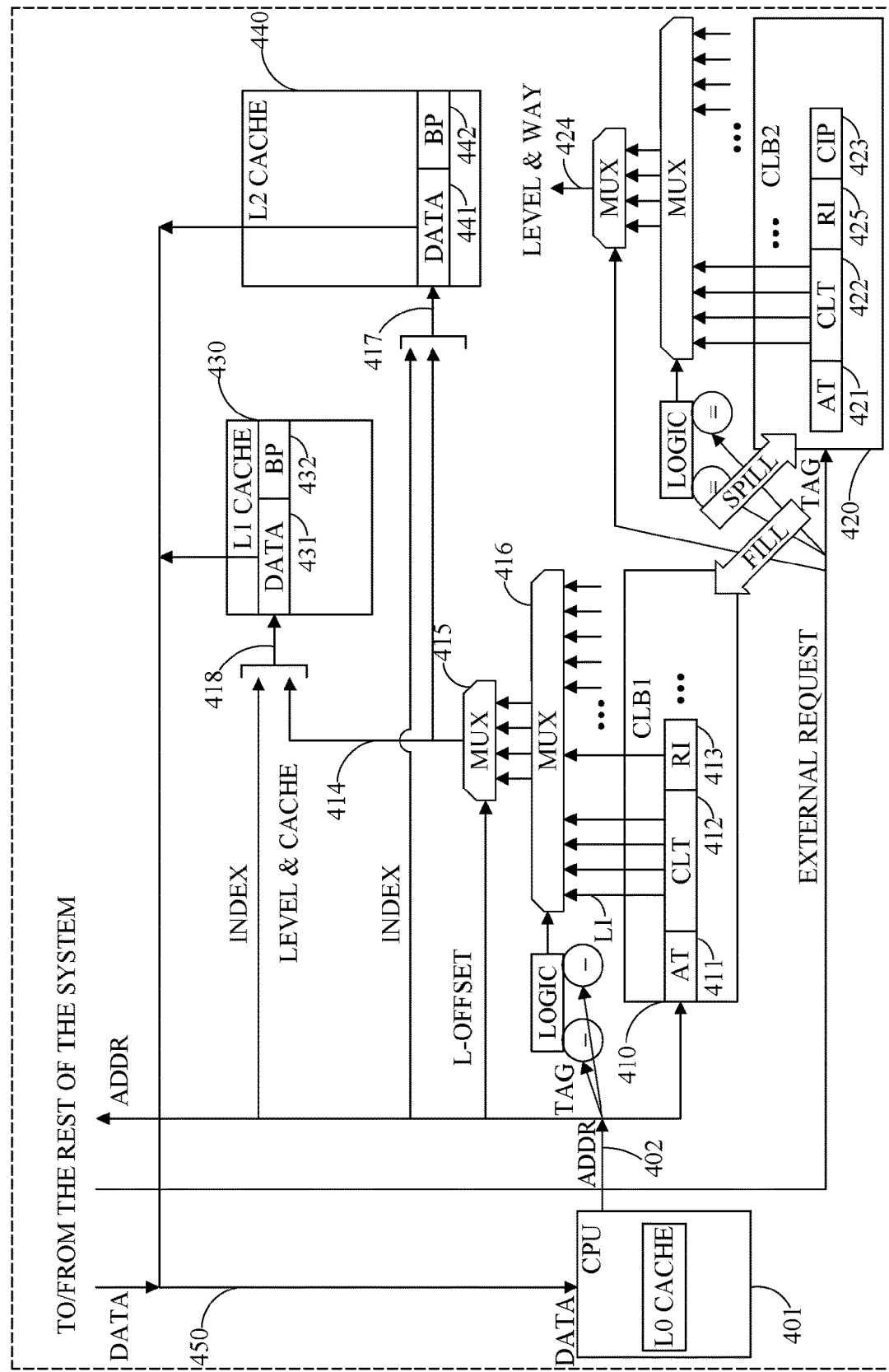
FIG. 4 is a block diagram illustrating an example implementation of a tag-less cache.
Figure 5:
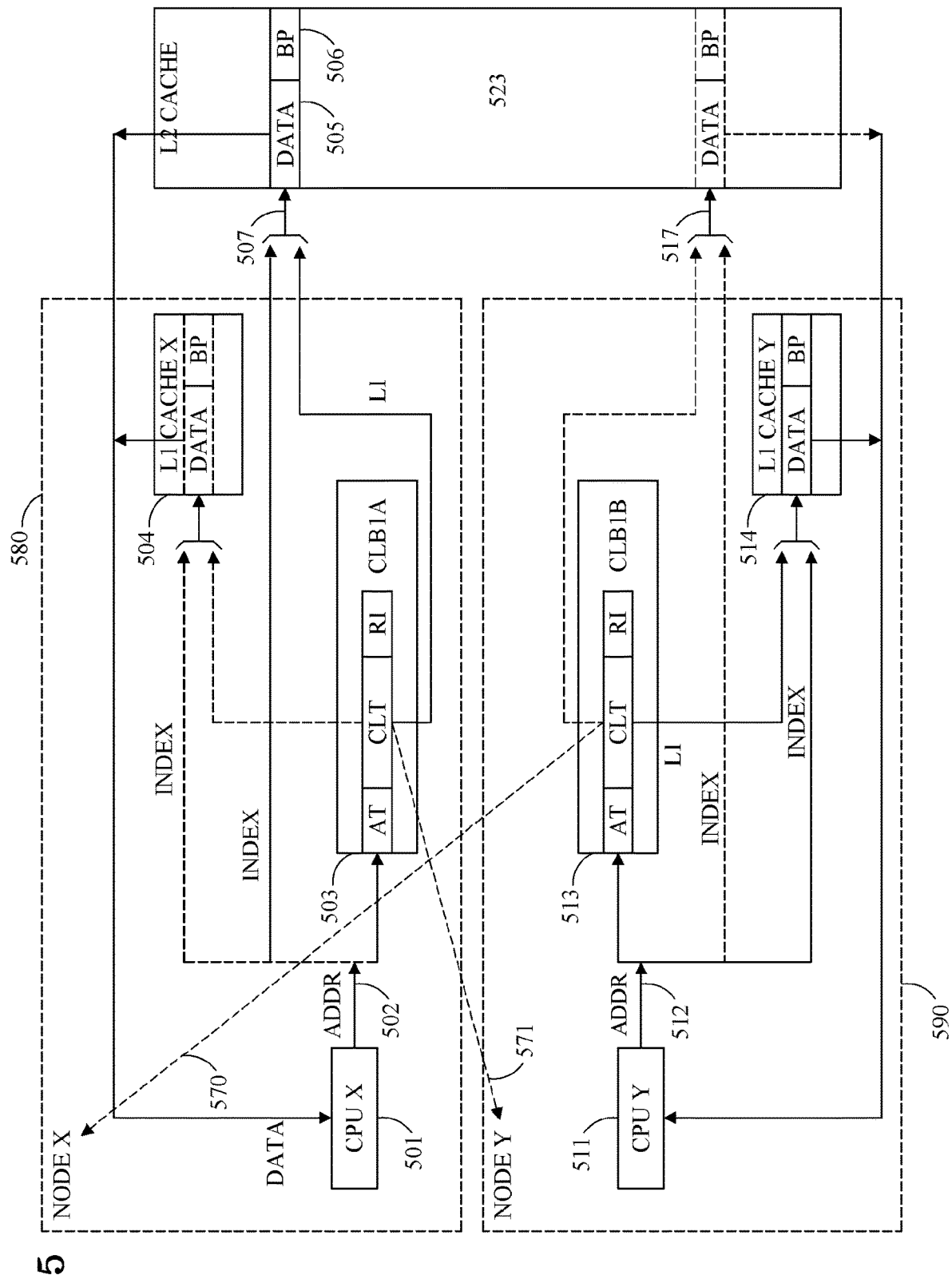
FIG. 5 is a block diagram illustrating a portion of a computer system including two CPUs connected to a two-level cache hierarchy and a two-level cache location buffer (CLB) hierarchy.
Figure 6:
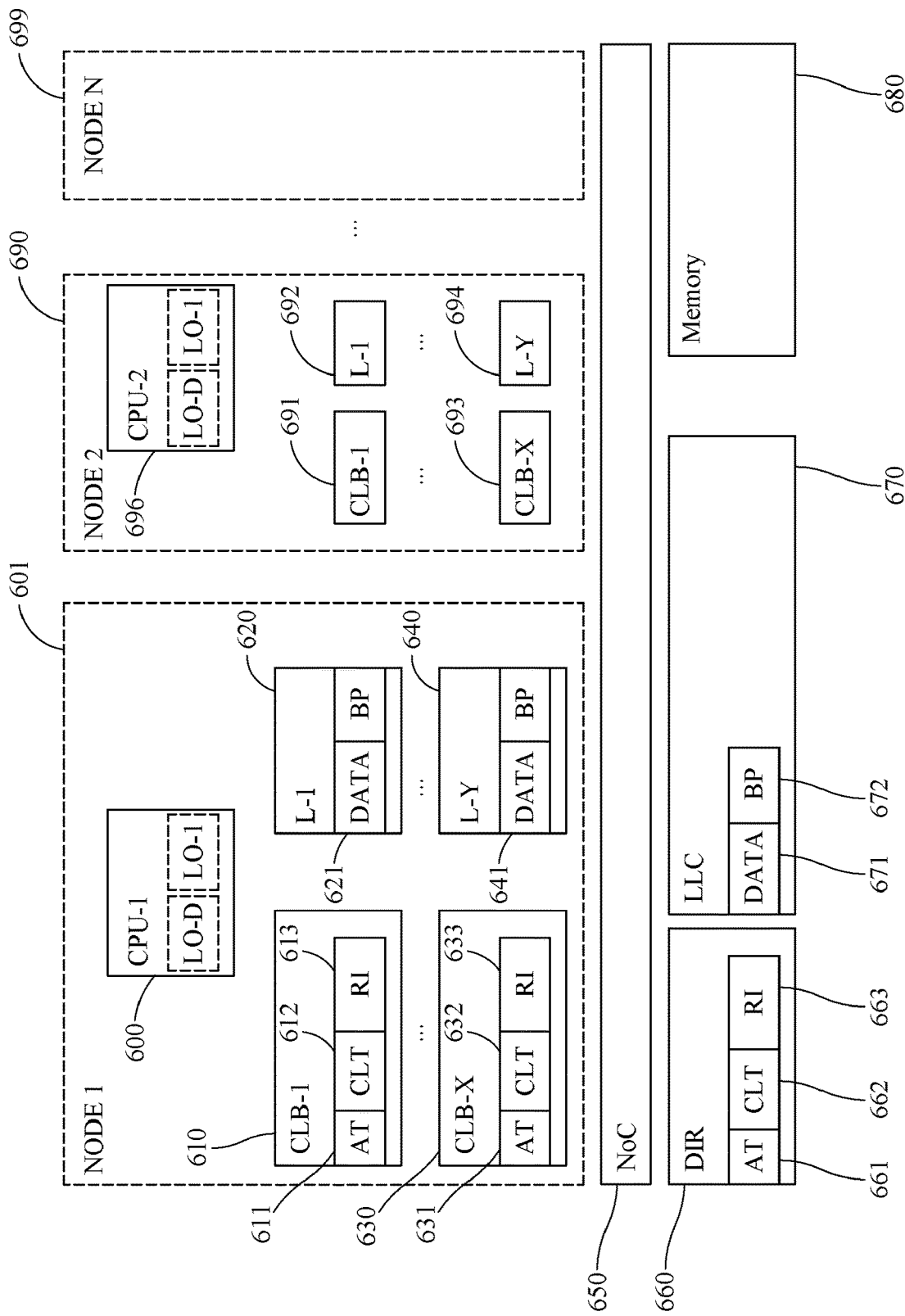
FIG. 6 is a block diagram illustrating a portion of a computer system including a tag-less cache hierarchy with a single monolithic last level cache.
Figure 7:
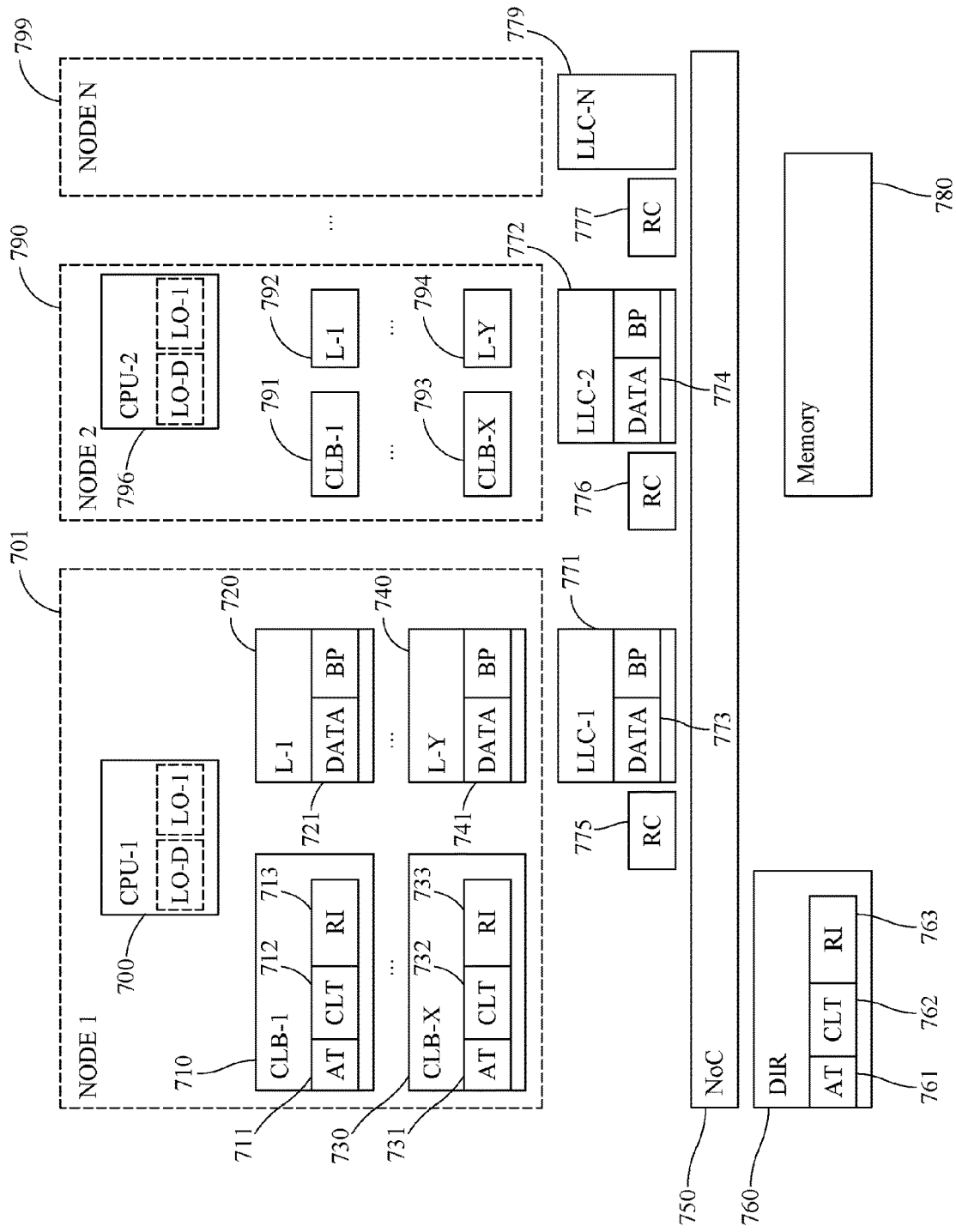
FIG. 7 is a block diagram illustrating a generalized tag-less cache hierarchy with many slices of last level cache.

Thus, according to at least some example embodiments of the inventive concepts, systems such as those illustrated in FIG. 1 and FIG. 2, can also include a cache handling scheme (CHS) as described herein. That scheme includes a cache location buffer (CLB), or a hierarchy of CLBs, that keep track of the location of data units stored in a cache hierarchy. Whenever a data unit is moved in the cache hierarchy, its new location is recorded in the CLB.

The CLB according to at least some example embodiments of the inventive concepts may be implemented as an associative organization, storing a plurality of cache location entries (CLE). Each CLE contains an address tag, used for the associative lookup, and some payload, for example a cache location table (CLT), storing a plurality of location information LI. Actually, the CLB itself can be viewed as a cache storing location information.

Features of at least some example embodiments of the inventive concepts will now be described with respect to FIGS. 8-10. For clarity, those skilled in the art will appreciate that these FIGs illustrate logical implementations of at least some example embodiments of the inventive concepts rather than actual physical implementations. Those skilled in the art will thus understand that these diagrams show logical representations of implementations and that physical implementations may differ substantially in their implementation details.

There has been wide variety of proposals for data compression in cache hierarchies. It has been recognized that some data values occur frequently in important applications. Representing such frequent data values using a 64 bit word can be redundant and waste cache capacity and static power. Instead, many proposals have suggested more efficient ways to represent frequent data values. While there are a wide variety of different complex compression algorithms, the overriding principle is fairly simple. Frequently used data values are detected and new efficient encodings of these values are introduced. These encodings can be static or dynamic. As a simple example, assume that the three hexadecimal values 0x0, 0x1, and 0xFFFFFFFF are frequently occurring in an application. This allows for 64-bit words storing any of these values to be represented using only two bits of information instead of the uncompressed 64 bits of information (8 bytes). Assume now that each 64 bit value within a cache line starts with an added 2-bit compression tag. If the compression tag has the value 1, 2 or 3, that implies that the word stores the respectively frequently occurring value 0x0, 0x1, and 0xFFFFFFFF respectively and that no more bits are needed to store the value of that word. Those compressed values can be represented by only storing their compression tag. The very next part of the cache line will store the compression tag of the next 64-bit word. If the compression tag stores the value 0, that implies that the next 64 bits of information following the compression tag stores an uncompressed value. If the eight 64-bit words of a 64-byte cache line contains 4 such compressed values and four uncompressed values, the cache line could be represented by about half as many bits compared with an traditional uncompressed cache line.

While the compression techniques proposed typically are more elaborate than the example above, they have the same compression effect: some cache lines can be represented by a smaller number of bits than a plain representation using 512 bits for a 64 byte cache line. However, finding a compressed representation for the data value of a cache line does not alone enable a more compact representation using traditional tag-based caches. The cache structure itself must also be altered to be able to access cache lines of varying size to take advantage of the compression.

Figure 8:
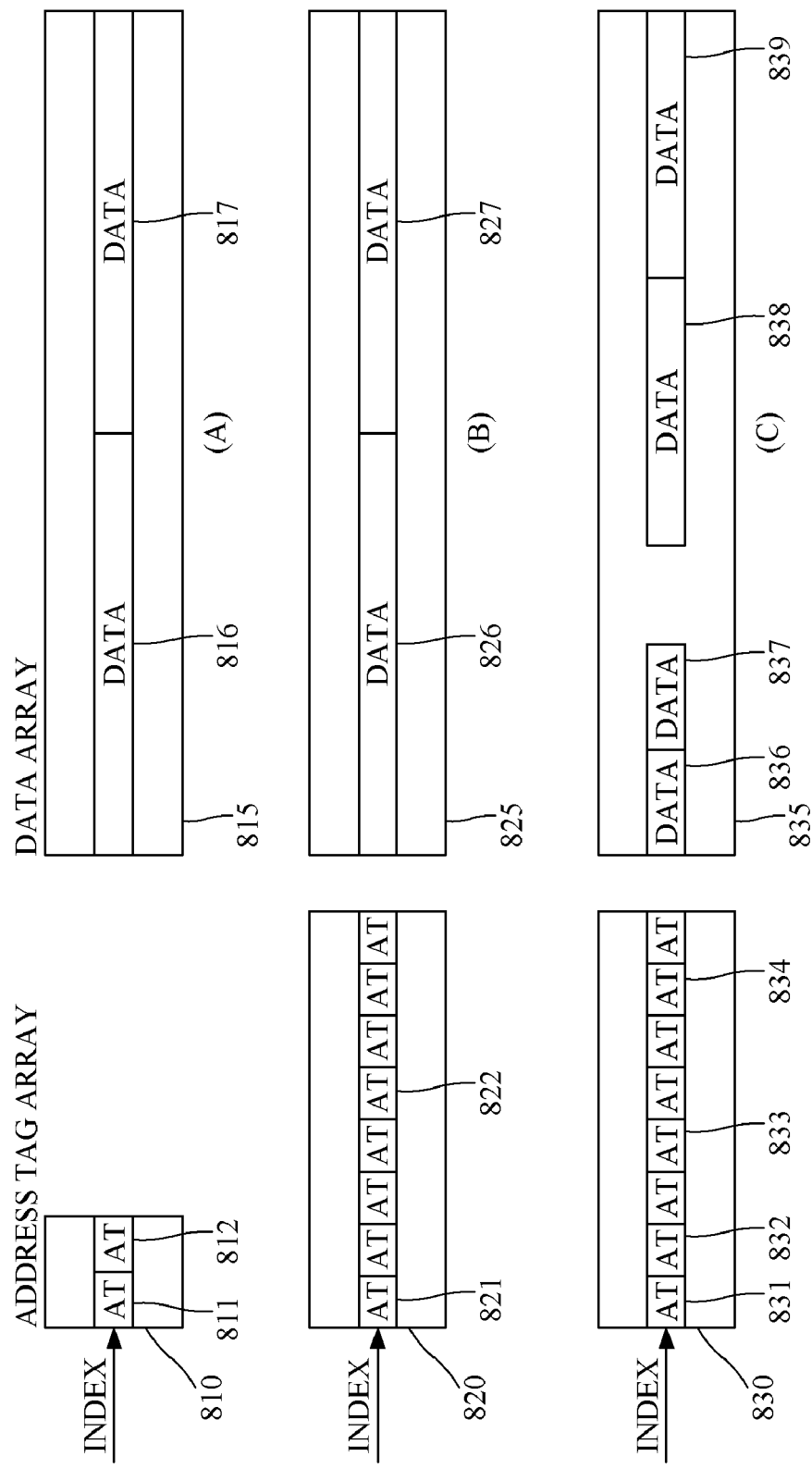
FIG. 8 is a block diagram illustrating three tag-based cache architectures with various degrees of data compression according to at least one example embodiment of the inventive concepts.

FIG. 8 is a block diagram illustrating three tag-based cache architectures with various degrees of data compression according to at least one example embodiment of the inventive concepts. Turning now to FIG. 8, this FIG. 8 shows three different set-associative caches. Even though only 2-way associative caches are shown in FIG. 8, these cache implementations can be generalized to associativity with a higher or lower number of ways. The top-most cache (A) consists of an address tag (AT) array 810 and a data array 815. On an access request to the cache, an INDEX function will select one set where the requested cache line may exist. Both address tags 811 and 812 are compared to the address of the request to determine if their respective cache line in the data array (816 and 817) stores the requested cache line. If none of the tags match the requested address, a cache miss has been determined.

The top-most cache (A) cannot benefit from a cache line compression scheme, like the simplified example discussed above, since it can only store two cache lines in each set. The (B) cache in FIG. 8 shows a design capable to benefit from cache compression. Even though each set currently holds two uncompressed cache lines per set in its data array, its corresponding tag array is designed to hold eight tags per set. Since each tag is rather large ($\approx$30-40 bits) and typically consumes more area per bit that, this is a fairly expensive solution for applications with few compressed cache lines, as shown in middle cache example (B). Here two uncompressed cache lines 826 and 827 are shown in data array 825. Only the address tags 821 and 822 corresponding to the beginning of each uncompressed cache line in the tag array are initialized to hold their corresponding address tag. The rest of the six address tags in the set are marked as not valid. So, cache (B) needs four time more address tag capacity than the (A) cache to store the same number of uncompressed cache lines However, if the cache architecture depicted in FIG. 8 (B) was used to run an application with many compressible cache lines, the cache usage shown for the bottom cache (C) could be achieved. Here, we assume a compression scheme that supports a compression degree of 4, i.e., it can represent a compressed cache line as 25%, 50% or 75% of the uncompressed cache line size. (a compression degree of 8 could compress a cache line down to 12.5% of its uncompressed size, etc.) If all cache lines were compressed to 25% of the uncompressed cache line size, each set could hold eight compressed cache lines. In that situation, each of the address tags of the tag array 830 would be valid and correspond to one compressed cache line each.

The bottom cache (C) is instead shown to store cache lines with a mixture of compression degrees: 25%, 50%, or 100%. A total of four cache lines 836, 837, 838 and 839 have been fitted into the set. There is a portion of the cache set that could not be utilized, i.e., seen as the gap between cache lines 837 and 838, which is known as fragmentation. Each of the four cache lines has a corresponding valid address tag 831, 832, 833 and 834, which is aligned with its starting point. The remaining address tags are not used and are marked as invalid. This implies that even in this fairly beneficial compression scheme that managed to store twice the number of cache lines in a set compared with example (A) and (B), half the address tags are still unused and will contribute to static power and area (and probably dynamic power as well, since they will likely be compared to the requested address).

Figure 9:
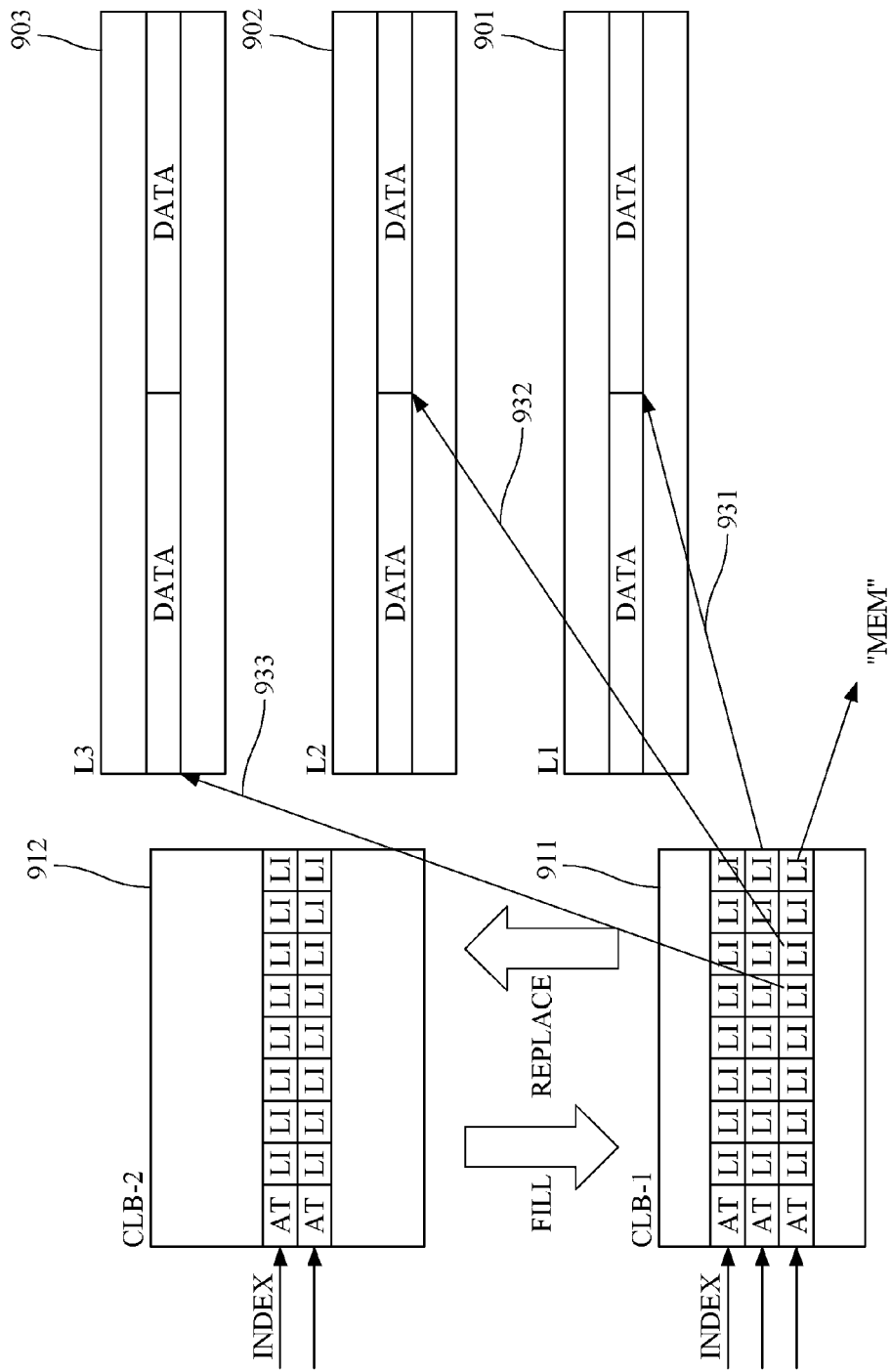
FIG. 9 is a block diagram illustrating a simplified representation of a tag-less cache system according to at least one example embodiment of the inventive concepts.

FIG. 9 is a block diagram illustrating a simplified representation of a tag-less cache system according to at least one example embodiment of the inventive concepts. FIG. 9 shows a cache system leveraging some of the tag-less technology depicted in FIG. 4-7. It contains two levels of CLBs 911 and 912. Even though the CLBs are shown as direct-mapped (1-way) structures in FIG. 9, their implementation would typically have a higher degree of set-associativity or skewed associativity organization. Each cache location entry (CLE) has one address tag and some number of location information LI pointers pointing to cache lines located in any of the cache levels L1 901, L2 902 or L3 903. As stated previously, each LI is encoded by a number of bits corresponding to the logarithm of the number of cache levels plus their associativity plus space for some "symbols", i.e., log 2(levels+ways)+1, assuming an even power-of-two for the number of levels and the number of ways and that some more "Symbols", such as "MEM" and "Don't Know" need to be encoded. Assuming a three-level cache hierarchy with 16-way associative caches at each level, an LI of 6 bits would be sufficient to also include encoding for "Symbols" encoding "MEM" and "Don't Know".

For simplicity, each of the 3 levels of caches in the hierarchy of FIG. 9 is shown to be a two-way associative cache storing uncompressed cache lines. FIG. 9 show how three such LI pointers 931, 932 and 933 point to the beginning of their corresponding cache line in each in the cache levels L1 901, L2 902 and L3 903, respectively.

Figure 10:
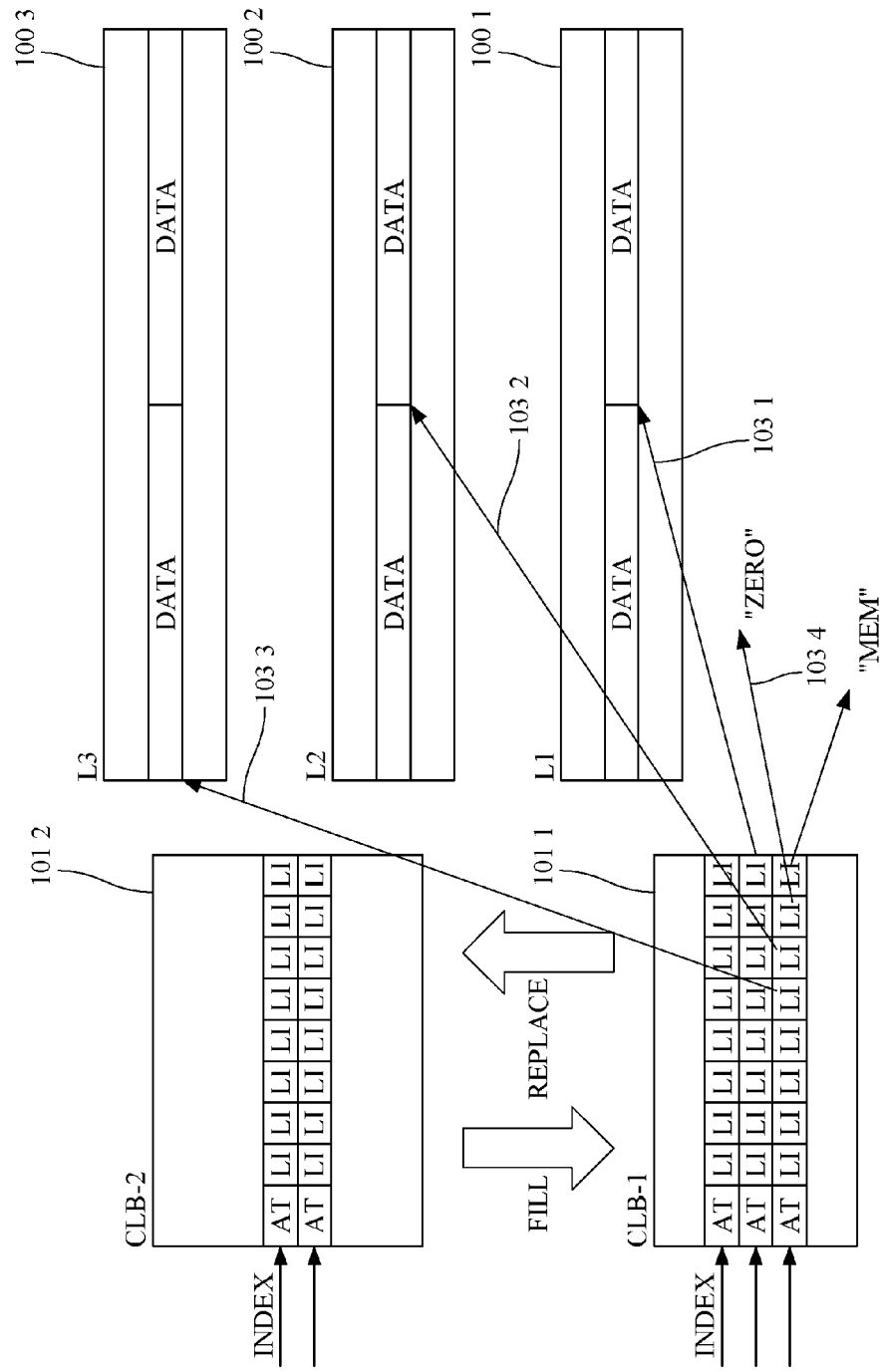
FIG. 10 is a block diagram illustrating a simplified representation of a tag-less cache system with efficient support for compressed data storage and handling according to at least one example embodiment of the inventive concepts.

FIG. 10 is a block diagram illustrating a simplified representation of a tag-less cache system with efficient support for compressed data storage and handling according to at least one example embodiment of the inventive concepts. FIG. 10 shows a cache hierarchy with the same capability of storing uncompressed cache lines as FIG. 9 (2 per set in this example). According to at least some example embodiments of the inventive concepts, compressed cache lines may be stored down to a specific compression degree, for example a compression degree of 4 as shown in FIG. 10. Each of the LI pointers (1031, 1032, 1033) point to the beginning of a compressed cache line in each of the three cache levels 1001, 1002, and 1003. This implies that the LI encoding should be able to identify up to four more locations in each cache set. While the cost of turning the traditional cache of FIG. 8 into a cache supporting a compression degree of 4 implies a linear cost: going from two address tags per set to eight address tags per set, where each address tag is 30-40 bits, the cost for supporting the same degree of compression in FIG. 10 is logarithmic, increasing the LI size by 2 bits. For example from 6 to 8. According to at least one example embodiment of the inventive concepts, supporting compressed cache lines of a certain compression degree D, the number of extra bits needed compared with a system supporting no compressing is log 2(D). In one example, the number of bits encoding each LI goes from log 2(ways+levels+1) to log 2(ways+level+compression_degree+1).

According to at least one example embodiment of the inventive concepts, LI is further extended to encode the size of the compressed cache line to which it is pointing. For a system with the highest compression degree of D, this would add an additional log 2(D) bits. According to at least one example embodiment of the inventive concepts, that would make the LI bit count log 2(ways+level+2×compression_degree+1). According to at least one example embodiment of the inventive concepts, the LI is further extended to encode the compression type, i.e., which decompression method is needed to decompress the cache line. Thus, it will be appreciated that at least some example embodiments of the inventive concepts enable the LI to be capable of identifying data locations with a finer granularity than the size of an uncompressed data unit.

Contrary to the system (C) shown in FIG. 8, the compression degree does not have to be built into hardware of FIG. 10 in the same way. There is no structural change similar to the change required to go from system (A) to system (C) of FIG. 8.

FIG. 10 also introduces another compression feature: a symbol "ZERO" encoded by LI, as shown by 1034. According to at least one example embodiment of the inventive concepts, LI storing the symbol ZERO implies that the entire cache line referred to by the LI stores the value ZERO. According to at least one example embodiment of the inventive concepts, there is no space allocated for a corresponding cache line in any of the caches if LI contains the symbol ZERO. According to at least one example embodiment of the inventive concepts, if a core reads a word from a cache line with its corresponding LI in CLB-1 storing the symbol ZERO, the cache hierarchy will return the value "0" to the core, but no cache lines will be allocated or moved in the hierarchy to achieve this. According to at least one example embodiment of the inventive concepts, when a cache line tries to store a word to a cache line with its corresponding LI in CLB-1 storing the symbol ZERO, a zero-filled cache line will be allocated in its L1 cache and it will eventually be given write permission to it. According to at least one example embodiment of the inventive concepts, the LI will be updated to reflect the fact that the master cache line is stored in its L1 cache.

In a multiprocessor system, it is possible that a cache line corresponding to a physical address have associated LIs in several CLB-1. If that is the case, either all or none of them should point to the symbol ZERO. According to at least one example embodiment of the inventive concepts, before allowing one core to have its cache line transition from a ZERO LI pointer to a zero-filled and writable cache line in its L1, a cache coherence protocol, e.g. similar to the one discussed for FIGS. 6 and 7, will need to get involved to make sure that the other LI=ZERO pointers associated with the same physical cache line are changed. According to at least one example embodiment of the inventive concepts, those other LI=ZERO pointers should be changed to a representation corresponding to a coherence state of invalid. According to at least one example embodiment of the inventive concepts, that change should adhere to the protocol discussed in FIGS. 6 and 7 and those other LI=ZERO pointers should be changed to point to the L1 location storing the new zero-filled writable cache line.

In practice, many cache lines contain the value "0". Whenever a new memory region is allocated in a runtime system, the entire memory region is initialized to hold the value "0". This is normally achieved by pointing the newly allocated virtual page to a special physical page: the zero page. In traditional cache systems, the zero page only contains cache lines storing the value "0". Cores reading the page will be returned the value "0". This is traditionally achieved by allocating and moving cache lines containing "0" in the hierarchy. The first time the core tries to write to a page mapping to the zero page, a trap is generated, a new physical page is allocated and initialized to only store "0" cache lines and the mapping of the virtual page is changed to point to the new physical page.

According to at least one example embodiment of the inventive concepts, the zero page is represented by a page with all its LIs storing the value ZERO. A read attempt to the zero page will not cause any cache line allocations in the cache hierarchy or any cache line movement. Instead, the core reading the zero page will be returned the value "0". According to at least one example embodiment of the inventive concepts, on a write attempt to the zero page, a trap is generated and the CLB-1 regions associated with the accessed virtual page (mapping to the zero page) will instead be associated with their new physical address. This could for example be achieved by changing a per-region physical address field associated with each CLE (also referred to as region), for example RI 413, 633 or 733. Such a scheme would use the cache capacity of the hierarchy in a more efficient way (no cache line allocated for the LI=ZERO cache line), would consume less bandwidth in the system (fewer movements of cache lines containing the value "0") and avoid unnecessary CPU work (copying the value zero to new cache lines).

According to at least one example embodiment of the inventive concepts, LI can encode other predefined values than "0", for example the value "1" and the value of storing the binary value "1" in all bits of the cache line. Someone skilled in the art would understand that any value could be chosen to be represented that way and that the values chosen could selected dynamically during an execution.

The steps described in conjunction with the in FIGS. (e.g., FIGS. 8-10) can be performed in various orders and some steps can be performed in parallel or sequentially. At least some example embodiments of the inventive concepts may provide various beneficial results. For example, detailed simulation studies performed in accordance with at least some example embodiments of the inventive concepts have shown that cache implementations according to at least some example embodiments of the inventive concepts can save substantial energy compared with conventional cache systems and can also result in caches with substantially shorter access time.

For clarity, most descriptions herein generally describe techniques for how a cache line is located and returned to a requesting CPU. The descriptions do not describe in detail the various ways in which a requested word contained within the cache line is selected and returned to the CPU. However, various methods for selecting a requested word contained within a cache line and returning the requested cache line to the CPU are known by those skilled in the art.

For clarity, most descriptions herein describing the handling of data of cache hierarchies describe exclusive cache hierarchies. Those skilled in the art would understand that one or more of the example embodiments of the inventive concepts can be extended to also cover inclusive memory hierarchies and non-exclusive memory hierarchies.

Although one or more of the example embodiments of the inventive concepts described above are useful in association with both uni-processor systems and multi-processor system, such as those illustrated and described above with respect to FIGS. 1 and 2 respectively, one or more of the example embodiments of the inventive concepts are illustrated primarily in association with a uniprocessor system. However, those skilled in the art will appreciate that one or more example embodiments of the inventive concepts illustrated in association with a uni-processor system are not limited to such an implementation. Although described above in the context of certain example computer architectures, caching exists in many other settings within, as well as outside, the example computer systems illustrated in FIGS. 8-10, and those skilled in the art will understand that at least some example embodiments of the inventive concepts described above within the context of computer system may also be applied to such other contexts. An example of such usages is the virtual memory system which caches data from a slow, high-capacity storage, such as a disk or FLASH memories, into a faster and smaller high-capacity memory that could be implemented using dynamic RAM. Other examples of caching in a computer system include, but are not limited to, disk caching, web caching and name caching. The organization and caching mechanisms of such caches may vary from those of the caches discussed above, e.g., variances in the size of a set, their implementation of sets and associativity, etc. Regardless of the implementation of the caching mechanism itself, at least some example embodiments of the inventive concepts are applicable for implementing the various caching schemes.

The methods or flow charts provided in the present application may be implemented in a computer program, software, or firmware tangibly embodied in a computer-readable storage medium for execution by a general purpose computer or a processor.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:
1. A multiprocessor system comprising:
a plurality of nodes and at least one memory, wherein each node includes at least one processor, a first cache private to the node, a second cache at a higher level than the first cache, and a cache location buffer (CLB) private to the node,
wherein, for at least one node of the plurality of nodes,
at least one of the first cache and the second cache included in the at least one node includes at least one cache location that is capable of storing a compressed data unit of varying size,
the CLB included in the at least one node is configured to store a plurality of CLB entries, each of the CLB entries including a plurality of location information values, the plurality of location information values including one or more first location information values and one or more second location information values, each first location information value pointing to a beginning of a location associated with a respective data unit,
each first location information value stored in the CLB included in the at least one node indicates the location to which the first location information value points to be,
a location within the first cache included in the at least one node,
a location within the second cache included in the at least one node, or
a location in the at least one memory,
at least one of the one or more first location information values is capable of identifying locations corre- sponding to the respective data unit, with a finer granularity than a size of an uncompressed data unit, and at least one second location information value from among the one or more second location information values encodes a symbol, which indicates a data unit stores a first value.

2. The multiprocessor system according to claim 1, wherein at least one location information value from among the one or more first location information values encodes a size of a compressed data unit to which the at least one location information value points.

3. The multiprocessor system according to claim 1, wherein at least one location information value from among the one or more first location information values encodes a compression type of a compressed data unit to which the at least one location information value points.

4. The multiprocessor system according to claim 1, wherein the first value is selected dynamically.

5. The multiprocessor system according to claim 1, wherein in response to the at least one processor included in the at least one node performing a read operation on a data unit pointed to by the at least one location information value encoding the symbol, the first value is returned to the at least one processor.

6. The multiprocessor system according to claim 5, wherein in response to the read operation, no location for the first value will be allocated or moved in the first and second cache included in the at least one node.

7. The multiprocessor system according to claim 1, wherein the first value is "0".

8. The multiprocessor system according to claim 1, wherein the first value is "1".

9. A data management method comprising:
storing data units in private caches in a plurality of nodes of a multiprocessor system, wherein each node includes at least one processor, at least one cache private to the node and at least one cache location buffer (CLB) private to the node; and
for at least one node from among the nodes of the multiprocessor system,
storing, in the at least one CLB included in the at least one node, a plurality of location information values, the plurality of location information values including one or more first location information values and one or more second location information values, each first location information value indicating a location associated with a respective data unit, wherein each first location information value stored in the at least one CLB indicates the location associated with the respective data unit to be,
a location within the at least one private cache included in the at least one node,
a location in one of the plurality of nodes other than the at least one node, or
a location in a main memory, and
encoding at least one location information value from among the one or more second location information values with a symbol which indicates that a data unit corresponding to the at least one second location information value stores a first value.

10. The data management method of claim 9, wherein the storing data units in private caches in nodes of a multiprocessor system comprises:
storing at least one of a compressed data unit of varying size and an uncompressed data unit in at least one cache location provided in the private cache, and wherein the first value is selected dynamically.

11. The data management method of claim 10, further comprising:
identifying locations corresponding to the respective data unit based on at least one location information value from among the one or more first location information values stored in the at least one CLB included in the at least one node, with a finer granularity than a size of an uncompressed data unit.

12. The data management method of claim 10, further comprises:
encoding at least one of the location information value from among the plurality of location information values with a size of the compressed data unit.

13. The data management method of claim 10, further comprises:
encoding at least one location information value from among the plurality of location information values with a compression type of the compressed data unit.

14. The data management method of claim 9, further comprises:
by the at least one processor included in the at least one node, performing a read operation on the data unit corresponding to the at least one second location information value encoded with the symbol; and
returning the first value to the processor.

15. The data management method of claim 14,
wherein the returning the first value to the at least one processor included in the at least one node includes returning the first value without allocating a location for the first value in the at least one private cache included in the at least one node.

16. The data management method of claim 9, wherein the first value is "0".

17. A non-transitory, computer-readable storage medium comprising computer-executable instructions that, when executed by a computer, cause the computer to perform operations including:
storing data units in private caches included in a plurality of nodes of a multiprocessor system, in global caches and a memory, wherein each node includes at least one processor and at least one cache private to the node, the plurality of nodes being connected via a network; and
for at least one node from among the plurality of nodes,
storing a plurality of location information values in a cache location buffer private to the at least one node; and
encoding at least one location information value from among the plurality of location information values with a symbol which indicates a data unit stores a first value.

18. The non-transitory computer readable storage medium according to claim 17, wherein the operations further include:
performing a read operation on a data unit indicated by the location information value encoded with the symbol; and
returning the first value to the at least one processor included in the at least one node, while no location for the first value is allocated in the at least one cache private to the at least one node, and
wherein the first value is selected dynamically.

19. The non-transitory computer readable storage medium according to claim 18, wherein the operations further include:

storing at least one of a compressed data unit of varying size and a uncompressed data unit in at least one cache location provided in the at least one cache private to the at least one node; and identifying locations corresponding to a respective data unit based on at least one location information value from among the plurality of location information values, with a finer granularity than the size of the uncompressed data unit.

20. The non-transitory computer readable storage medium according to claim 19, wherein the operations further include:

encoding at least one location information value from among the plurality of location information values with a size of the compressed data unit.

* * * * *